United States Patent [19]
Gibbs

[11] Patent Number: 5,725,892
[45] Date of Patent: Mar. 10, 1998

[54] APPARATUS FOR CREATING FISHING WORM HAVING ATTRACTANT DISCHARGE ARRANGEMENT

[75] Inventor: Louie W. Gibbs, Clermont, Fla.

[73] Assignee: Classic Fishing Products, Inc., Clermont, Fla.

[21] Appl. No.: 621,893

[22] Filed: Mar. 26, 1996

[51] Int. Cl.[6] ................................................. B29C 45/44
[52] U.S. Cl. .................. 425/577; 43/42.06; 43/42.35; 43/42.53; 249/55; 249/63; 425/438; 425/DIG. 58
[58] Field of Search .................. 43/42.06, 42.35, 43/42.53; 249/55, 63; 264/318; 425/577, 438, DIG. 58

[56] References Cited

U.S. PATENT DOCUMENTS

| | | | |
|---|---|---|---|
| 2,129,245 | 9/1938 | Stenstrom | 43/42.06 |
| 3,108,389 | 10/1963 | McGuire | 43/42.06 |
| 3,526,988 | 9/1970 | Young | 43/42.53 |
| 3,799,494 | 3/1974 | McLean, Jr. | 425/812 |
| 3,861,075 | 1/1975 | Ingram | 43/42.35 |
| 3,968,951 | 7/1976 | Zeman | 249/55 |
| 4,021,515 | 5/1977 | Neuman | 425/468 |
| 4,196,884 | 4/1980 | Zeman | 249/55 |
| 4,216,605 | 8/1980 | Showalter | 43/42.53 |
| 4,245,420 | 1/1981 | Carr | 43/42.06 |
| 4,437,257 | 3/1984 | Kluge | 43/42.45 |
| 4,452,420 | 6/1984 | Lundquist | 249/175 |
| 4,463,018 | 7/1984 | Carr | 43/42.06 |
| 4,732,726 | 3/1988 | Grannen, III | 264/272.21 |
| 4,969,811 | 11/1990 | Littleton | 425/116 |
| 5,090,886 | 2/1992 | Jaroschek | 425/130 |
| 5,142,811 | 9/1992 | Freeman | 43/42.53 |
| 5,295,801 | 3/1994 | Sugiyama et al. | 425/130 |
| 5,381,620 | 1/1995 | Gibbs | 43/42.09 |
| 5,517,781 | 5/1996 | Paoletta, Jr. | 43/42.06 |

FOREIGN PATENT DOCUMENTS

| | | | |
|---|---|---|---|
| 1150413 | 1/1958 | France | 43/42.06 |

*Primary Examiner*—Robert Davis
*Attorney, Agent, or Firm*—Julian C. Renfro, Esq.

[57] ABSTRACT

A mold utilized for creating a fishing worm having an abdominal cavity that contains an attractant gel having a stimulating taste to a fish, the mold having first and second sections, with each section having a cavity portion. Each cavity portion of the mold represents a part of a desired worm configuration, with the cavity portion of one mold section being able to be brought into careful alignment with the cavity portion of the other mold section, after which molten plastic can be injected into the completed mold cavity constituted by the aligned cavity portions of the first and second mold sections. An elongate plug held in place by a small diameter supporting member is mounted in a mid portion of the cavity of the first mold section, at a position corresponding to the abdominal region of the worm to be created. Thus, upon molten plastic being inserted into the completed mold cavity, a plastic worm will be defined, with such worm having an abdominal cavity resulting from the utilization of the elongate plug. The small diameter supporting member causes a hole to be made in the sidewall of each plastic worm so created, through which the attractant gel having a pleasant taste to a fish can thereafter be injected.

7 Claims, 7 Drawing Sheets

APPARATUS FOR CREATING FISHING WORM HAVING ATTRACTANT DISCHARGE ARRANGEMENT

FIELD OF THE INVENTION

This invention relates generally to the creation of fishing lures and, more particularly, to a novel method and apparatus for creating fishing worms for use with a natural tasting attractant discharged when a fish bites on the worm.

RELATIONSHIP TO RELATED INVENTION

This invention bears a distinct relationship to the co-pending invention of Louie W. Gibbs and Dr. William E. S. Carr, Ser. No. 08/621,892, filed Mar. 26, 1996, entitled "FISHING WORM DISCHARGING STIMULANT-CONTAINING GEL WHEN TAKEN BY FISH," which is directed to a novel, low cost worm having an abdominal cavity that contains a fish attractant gel, some of which escapes when a fish takes the worm into his mouth, with the attractant gel motivating the fish to swallow the worm and thus bring about the fish being hooked.

BACKGROUND OF THE INVENTION

Artificial lures have long been used to attract and catch fish, and it is known that some prior art lures include a dischargeable attractant to further improve their performance. As such a lure is drawn through water, the attractant is discharged and disperses through the water, increasing the likelihood that nearby fish will strike the lure.

A variety of different attractants have been used to increase the effectiveness of fishing lures in this manner. For example, solid and liquid attractants have been employed, depending upon a variety of factors, including the technique used to discharge the attractant and the conditions under which the lure will be used. The manner in which attractants enhance the desirability of the lure to fish has also varied.

Many natural and synthetic products, including fish oils and anise, can be used as scented attractants to stimulate the fish's sense of smell. Other attractants have also been used to make the lure more visually appealing to nearby fish.

Like the different attractants, a variety of different techniques have been employed to couple the attractant to the fishing lure. For example, the exterior of an artificial lure, such as a plastic worm, is sometimes treated with a scented attractant to improve the lure's effectiveness. This treatment is typically performed by dipping a portion or the entirety of the lure in a quantity of a liquid attractant. Alternatively, where the surface of the lure includes a plurality of small cavities, solid attractant can be applied to the lure's exterior and compacted in the cavities, allowing at least some of the scented material to disperse through the water.

As an alternative to the use of attractant on the lure's exterior, various approaches have been developed for discharging attractant from the interior of the lure. For example, hollow lures have been designed for receiving scented solids or scented liquids in a solid matrix. Such lures include a plurality of small openings between the interior and exterior of the lure, allowing water to flow through the lure and disperse at least some of the scented material.

In studies conducted with regard to black bass, it was found that bass are unable to smell or become aware of the attractant released into the water by conventional techniques, for the amount of attractant dispersed into the water is so small and so dilute as to make it unlikely that it will be detected by the bass. This of course means that lures presently on the market that are touted as being able to disperse fish attractant in a successful manner are in reality quite ineffective in most instances.

In other embodiments, a liquid attractant is stored in a chamber controllably coupled to a fishing line attached to the lure. The fishing line is connected to a mechanism for controlling the volume of the chamber or for controlling an outlet of the chamber, or both. By applying tension to the fishing line, the outlet of the chamber can be opened and its volume reduced, thereby discharging attractant to the surrounding water.

Although each of these prior art arrangements enhances lure performance, they suffer a number of disadvantages. For example, when the exterior of the lure is provided with attractant, the fisherman typically has no control over the rate or manner of attractant dispersion. This is particularly true when solid attractant is applied to the exterior of the lure, because the attractant may easily be dislodged by the force of the water against the lure or by a fish biting or "striking" the lure. The use of solid attractant inside a hollow, perforated lure body also provides the fisherman with little control over the attractant's discharge rate. The fisherman can only select different attractants and place varying amounts of attractant inside the lure body.

Fish attractants of watery consistency have been particularly ineffective because they quickly become diluted, and it has been found that very little evidence of the attractant remains in the water after an elapse of approximately five minutes.

Similarly, embodiments that employ line tension to control the discharge of liquid attractants are inadequate. More particularly, when a fish strikes the lure, the tension in the line will increase, discharging attractant. The occurrence and duration of this discharge is both beyond the fisherman's control as well as being quite unnecessary, given that the fish has already struck.

It was to overcome the lack of effectiveness and the expense of prior art devices that the present method and apparatus for making these novel lures was evolved.

SUMMARY OF THE INVENTION

Investigations have shown that some varieties of fish take a bait or lure into their mouth for tasting purposes before deciding whether or not to swallow it, and such studies have indicated that some fish actually spit out the bait or lure if they find it undesirable or distasteful for any reason.

It has been found that black bass strike a lure as the result of both sight and sound, but after the lure is in the mouth of the bass, the sense of taste plays a big part in hooking the fish.

The bait or lure constructed in accordance with the teachings of the related co-pending patent application "FISHING WORM DISCHARGING STIMULANT-CONTAINING GEL WHEN TAKEN BY FISH" mentioned hereinabove involves a worm in the head of which a hook is to be placed, with the abdomen of the worm containing a gel having a natural taste that fish find attractive, so that the fish will be likely to swallow the bait and thereby become hooked.

Novel molds are taught in accordance with the instant invention, by the use of which molds, the highly advantageous worms are created, with the abdominal portion of each worm being hollow and ready to receive a substance likely to attract fish. Although a noise maker such as a rattle or the like could be utilized in the abdominal portion, in the preferred instance I utilize a cavity in the abdomen of each worm designed to contain a fish attractant. Such cavity is accessed through at least one hole, but preferably through small upper and lower holes. The fish attractant is typically in the consistency of a gel having what may be regarded as a considerable amount of staying power, which gel is inserted into the cavity by the use of a tube, resembling a relatively small toothpaste tube equipped with a relatively long spout. Because of the viscosity of the gel I prefer to use, the second hole in the abdominal sidewall of the worm becomes important in providing a means for the escape of air from the cavity during the filling procedure. The attractant preferably has the same chemical makeup as contained in natural live food.

It is to be noted that two relevant bait patents exist, both of which are entitled "ARTIFICIAL BAIT FOR AQUATIC SPECIES," with one of these being U.S. Pat. No. 4,245,420 which issued in Jan. 20, 1981 and U.S. Pat. No. 4,463,018 which issued Jul. 31, 1984. Both of these patents were issued to Dr. William E. S. Carr and both patents describe gels containing feeding stimulants for fish. The flesh-like gel is afforded increased tear strength to keep it on a fish hook by the incorporation into the gel of a tear-resistant fabric such as cheesecloth.

In essence, these earlier patents were designed to provide a gel plus a tear-resistant binder that was tough enough to serve as a substitute for a natural bait (e.g., shrimp, squid) which is mounted and fished directly on a hook. In contrast, the gel developed for injection into the worms described in the copending invention is neither tear-resistant nor tough. Rather, the gel described for use in conjunction with the instant worms is a soft, highly-viscous material designed for injection into the lumen of a plastic worm or other artificial bait.

The gel preferred for use may have a viscosity that ranges between that of a thick syrup and vaseline. The gel is not intended to quickly leak from the lumen in the worm; rather it is formulated to remain within the lumen for an extended period and to maintain most of its flavor, taste and odor during that time. The fact that the gel is hydrophilic in nature assures that water-soluble tastants or odorants are available for a prolonged period in a form that fish can taste.

The major gelling agent using in the current gel is carboxymethylcellulose (CMC). CMC has a major advantage over many other gelling agents in that the gelling process, and hence the gel preparation itself, is done at room temperature, with no heat being required. The CMC concentration can be varied from about 1 to 10% to increase or decrease the viscosity. The preferred CMC concentration is about 3%.

Other gel components include water, glycerol, feeding stimulant, a maltodextrin filler/humectant, a citrate buffer to control the Ph (acidity), and the preservative, potassium sorbate.

The feeding stimulant can be a synthetic mixture of amino acids, quaternary amines, nucleotides and organic acids such as those described in two fairly recent articles. One of these is "Chemically Stimulated Feeding Behavior in Marine Animals: the Importance of Chemical Mixtures and the Involvement of Mixture Interactions," the *Journal of Chemical Ecology*, Volume 12: Pages 989–1011 (1986), and the other is "The Molecular Nature of Chemical Stimuli in the Aquatic Environment;" *Sensory Biology of Aquatic Organisms.* This latter article was edited by Atema, J., Ray, R. R., Popper, A. N. and Tavolga, W. N., Pages 3–27, Springer, N.Y., (1988). Alternatively, the feeding stimulant can be a fish or shrimp meal, or an admixture of a meal and a synthetic mixture. Feeding stimulant concentrations in the range of 1 to 20% can be employed; the preferred concentration is 10%. Browning of the gel due to the common Maillard reaction, can be retarded if necessary with sodium bisulfite.

Some attractant material tends to leach out as the lure moves through the water, but the principal function of the novel worm is to entice a fish to hold onto the lure and swallow it, presuming it to be real food.

Pressure applied by the fish's jaws causes some of the attractant gel to emerge from one or both of the abdominal holes, and by its pleasant taste to indicate to the fish that he should swallow the worm. The hook that had earlier been threaded through the head of the worm then engages the fish's mouth so that the fish can be landed.

It has been found that the viscosity of the gel is such that the novel worm to which the present invention is closely related will be highly effective for at least one-half hour in the water, which is in contrast with the effectiveness of a lure utilizing a watery attractant. In latter instance, the attractant remains effective only for a short period of time, typically five minutes.

A novel mold in accordance with the instant invention utilized for creating worms each having a hollow abdominal portion involves a pair of interfitting sections, with each mold section defining a number of cavity portions. Each of such cavity portions is created in a desired configuration, with the cavity portions of one mold section defining say the upper portion of each worm, and the cavity portions of the other mold section defining the lower or remaining portion of each worm to be formed. The cavity portions are carefully laid out in the respective mold sections, such that completed cavities are created upon the mold sections being brought in a carefully aligned manner into an operable relationship. A preestablished number of completed cavities are thus formed as a result of the cavity portions of the two mold sections being brought into a contiguous relationship as a consequence of the mold sections having been properly interfitted. Molten plastic typically at a temperature of approximately 340° can then be injected into the completed cavities through a common inlet, thus to create the worms.

In accordance with this invention, a first of the mold sections utilizes an elongate plug or male member mounted in a mid portion of each cavity portion. Such elongate plug, also known as a core pin, is held in place by a supporting member of small diameter that is rigidly mounted in the mid portion of each cavity portion of such first mold section. The position of the elongate plug in each cavity portion corresponds to the abdominal region of each worm to be created. A second of the mold sections utilizes a plurality of fixed pins, with one of such pins being disposed in a mid portion of each cavity portion of the second mold section. Because the cavity portions of the upper and lower mold sections are in a carefully established alignment, it is readily possible for each such fixed pin of the second mold section to be disposed in alignment with the respective elongate plug or core pin of the first mold section.

Each of such pins has a tip, with the length of each pin in the second mold section being such that the tip of each pin is in contact with the respective elongate plug utilized in each cavity portion of the first mold section when the mold sections have been interfitted. As a result of this arrangement, upon the mold sections being placed in an operable relationship, the numerous mold cavity portions are completed. Then, upon molten plastic being inserted through the common inlet duct into the interfitted mold sections, a plurality of plastic worms will be defined in the completed cavities, with each worm having an abdominal cavity of desired configuration, resulting from the utilization of the plug. The small diameter supporting member and the pin utilized in conjunction with each cavity portion cause a pair of relatively small holes to be established in the abdominal sidewall of each worm created during the molding process, with these holes being of importance to the fisherman inasmuch as the comparatively viscous attractant gel is typically inserted into the abdominal cavity of the worm immediately prior to the head portion of the worm being inserted onto the fishhook.

It is a primary object of this invention to provide highly effective method and apparatus for creating novel, low cost worms, with each worm having a hollow abdominal cavity designed to accommodate a substance or component attractive to a fish.

It is another object of this invention to provide highly effective method and apparatus for creating novel, low cost worms, with each worm having a hollow abdominal cavity adapted to contain a fish attractant gel, some of which escapes when the fish crushes the lure in his mouth, with the attractant gel, because of its close resemblance to the taste of a natural food, inviting the fish to swallow the worm and thus bring about the fish being hooked.

It is still another object of this invention to provide a low cost method of creating worms to be injected with a fish attractant gel immediately before the fisherman inserts the hook through the head of the worm, thus to provide a taste causing the fish to hold the worm firmly in his mouth, and thereby bring about the hook in the head of the worm coming into firm engagement with the fish's mouth.

It is yet another object of this invention to provide a novel mold utilized in the creation of fishing worms, with this mold having a pair of interfitting sections, and with each mold section having a number of cavity portions, with an elongate plug supported in each cavity portion of one mold section, and with each plug being responsible for creating a hollow abdominal region in each worm during the molding process, with the relatively thin support for each elongate plug bringing about the creation of a hole in the sidewall of the abdomen portion of each worm during the molding process.

It is yet still another object of this invention to provide a novel mold utilized in the creation of fishing worms, with this mold having a pair of interfitting sections, with each mold section having a number of cavity portions brought into alignment when the mold sections are brought together, with an elongate plug utilized in each cavity portion of one mold section being responsible for the creation of a hollow abdominal region in each worm, with the support for each elongate plug in the cavities of one mold section being responsible for bringing about the creation of one hole in the abdomen sidewall of each worm, and a pin in each cavity of the other mold section causing the creation of a second hole in the abdomen sidewall of the worm, thus to simplify the fisherman injecting relatively viscous attractant gel into the abdomen of each completed worm, immediately prior to the worm being impaled on the fishhook.

It is yet still another object of this invention to provide a novel method of creating fishing worms from molten plastic, involving mounting an elongate plug in a selected location in each cavity of a mold, so that when molten plastic is injected into the mold cavities, a worm having a hollow abdominal portion will be created, which hollow portion is adapted to receive an attractant gel.

It is a yet still further object of this invention to provide a novel method of creating fishing worms from molten plastic, involving supporting an elongate plug in the cavity of a mold by the use of a slender supporting member, so that when molten plastic is injected into the cavity of the mold, a worm having an attractant-receiving cavity in its abdominal region will be created, with the supporting member creating a hole in the abdominal sidewall of the worm, through which hole the plug can be withdrawn when the worm is being removed from the mold, and through which hole, an attractant gel can thereafter be inserted.

It is yet still further object to provide a novel method of creating fishing worms from molten plastic, involving supporting an elongate plug in each cavity portion of a first mold section by the use of a slender supporting member, and mounting a pin in a fixed location in each cavity portion of a second mold section, so that when the mold sections have been interfitted and molten plastic has been injected into the completed cavities of the interfitted mold sections, a worm having an attractant-receiving cavity in its abdominal region will be created in each cavity of the mold sections, with the supporting member creating a first hole in the abdominal sidewall of each worm, and the fixed pin creating a second hole in the abdominal sidewall of each worm, through one of which holes a relatively viscous attractant gel can thereafter be inserted, and through the other of which holes air can be displaced during the procedure in which the attractant gel is added to the abdominal cavity of each mold.

These and other objects, features and advantages will be more apparent from a study of the appended drawings.

BRIEF DESCRIPTION OF DRAWINGS

FIG. 8a is a fragmentary view closely relatable to FIG. 8, but showing the ball valve in the position closing off the flow of molten plastic.

DETAILED DESCRIPTION

Figure 1:
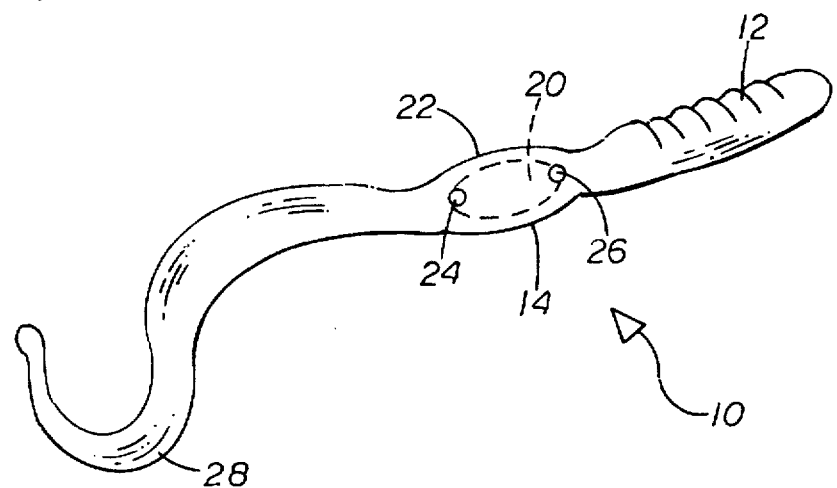
FIG. 1 is a view of an embodiment of a fishing worm in accordance with the related invention of Louie W. Gibbs and Dr. William E. S. Carr entitled "FISHING WORM DISCHARGING STIMULANT-CONTAINING GEL WHEN TAKEN BY FISH," with dashed lines utilized in a mid portion of the worm indicating the presence of an abdominal cavity that can be filled with a gel designed to a have a taste attractive to a fish.

It is to be noted by referring to FIG. 1 that in this figure I have depicted a novel fishing worm 10 of flexible plastic created in accordance with the previously identified co-pending invention entitled "FISHING WORM DISCHARGING STIMULANT-CONTAINING GEL WHEN TAKEN BY FISH," with the worm having a head portion 12 and a tail portion 28. Significantly from the standpoint of this invention, an abdominal region 14 is located between the head and tail portions. In accordance with typical practice, the head portion 12 is intended to receive a hook 16 attached to a fishing line 18 just before the fisherman casts; note FIG. 2.

The abdominal region 14 of the worm has a hollow cavity 20 bounded by relatively thin sidewalls 22, with this hollow cavity being created by the utilization of novel mold sections hereinafter discussed in greater detail.

At least one hole 24, but typically a pair of holes 24 and 26 are provided in the sidewall 22 bounding the abdominal portion. It is desired in accordance with this invention for a viscous gel having a pleasant taste to a fish to be inserted into the abdominal cavity 20, and this is accomplished by virtue of the provision of the pair of holes 24 and 26.

Although the injection of gel into the abdominal cavity 20 may be accomplished by the manufacturer, with sealing means utilized on the worm to prevent the premature escape of the gel, in accordance with the preferred embodiment of this invention, the fisherman accomplishes the insertion of the relatively viscous gel into the hollow cavity 20 immediately prior to casting the worm.

Figure 2:
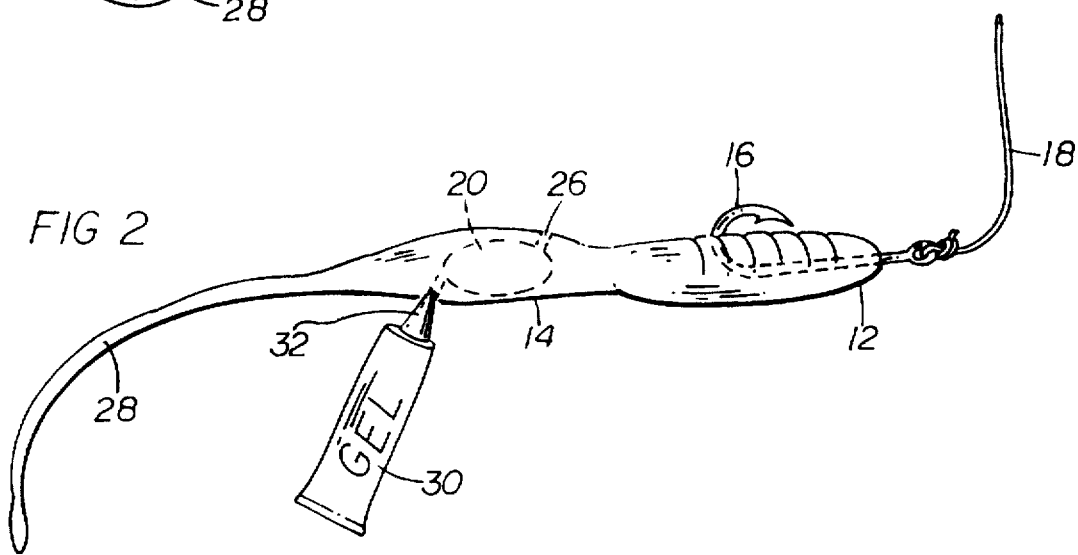
FIG. 2 is a view of the embodiment of FIG. 1 in which the body of the worm has been turned approximately 90° with respect to the position illustrated in FIG. 1, and revealing the manner in which the fisherman may insert gel into the abdominal cavity of the worm just prior to casting the worm and line into the water.

In the manner revealed in FIG. 2, a tube 30 having a relatively thin tapered spout 32 is included in the package that is sold which contains a number of the novel worms, so that immediately before utilization of each worm, the fisherman can insert the spout 32 into one of the abdominal holes, in the manner shown in FIG. 2. A bit of pressure applied between the thumb and the forefinger to the tube 30 is sufficient to cause the flow of the gel into the abdominal cavity 20 of the worm.

Because the polyvinylchloride (PVC) plastic used in the construction of the worms is flexible, the sidewalls of the worm can distend a bit during this gel insertion procedure. The filling procedure typically continues until the air has been displaced from the abdominal cavity, and some of the gel begins to escape from the other of the abdominal holes, latter hole serving as a vent.

Investigations have shown that some varieties of fish take a bait or lure into their mouth for tasting purposes before deciding whether or not to swallow it, and such studies have indicated that some fish actually spit out the bait or lure if they find it undesirable, such as not having a taste resembling the taste of natural food. It has been found that by filling the abdominal cavity with a gel having a taste attractive to a fish, some of the attractant material leaches out through the abdominal holes as the worm moves through the water. At the time the pressure of the fish's jaws on the abdominal portion 20 of the worm causes the escape of some of the gel from one or both of the abdominal holes, the fish will be enticed to hold on to the worm or lure and swallow it as real food. Because of the hook 16 inserted into the head 12 of the worm, the swallowing of the worm causes the tip of the hook to firmly engage the fish's mouth.

It has long been known to mold plastic fishing lures from suitable plastic utilizing various types of molds. One example is exemplified by the Littleton U.S. Pat. No. 4,969,811 entitled "APPARATUS FOR MAKING PLASTIC DEVICE." The Littleton patent is not truly consequential to the present invention, for it is concerned with the molding of lures having skirts of stranded plastic. Nevertheless, the Littleton patent shows the use of mold cavities involving male and female mold components that cooperate in such a manner that a number of lures having stranded skirts can be molded at one time by the use of a suitable plastic heated to a proper molding temperature.

Figure 3:
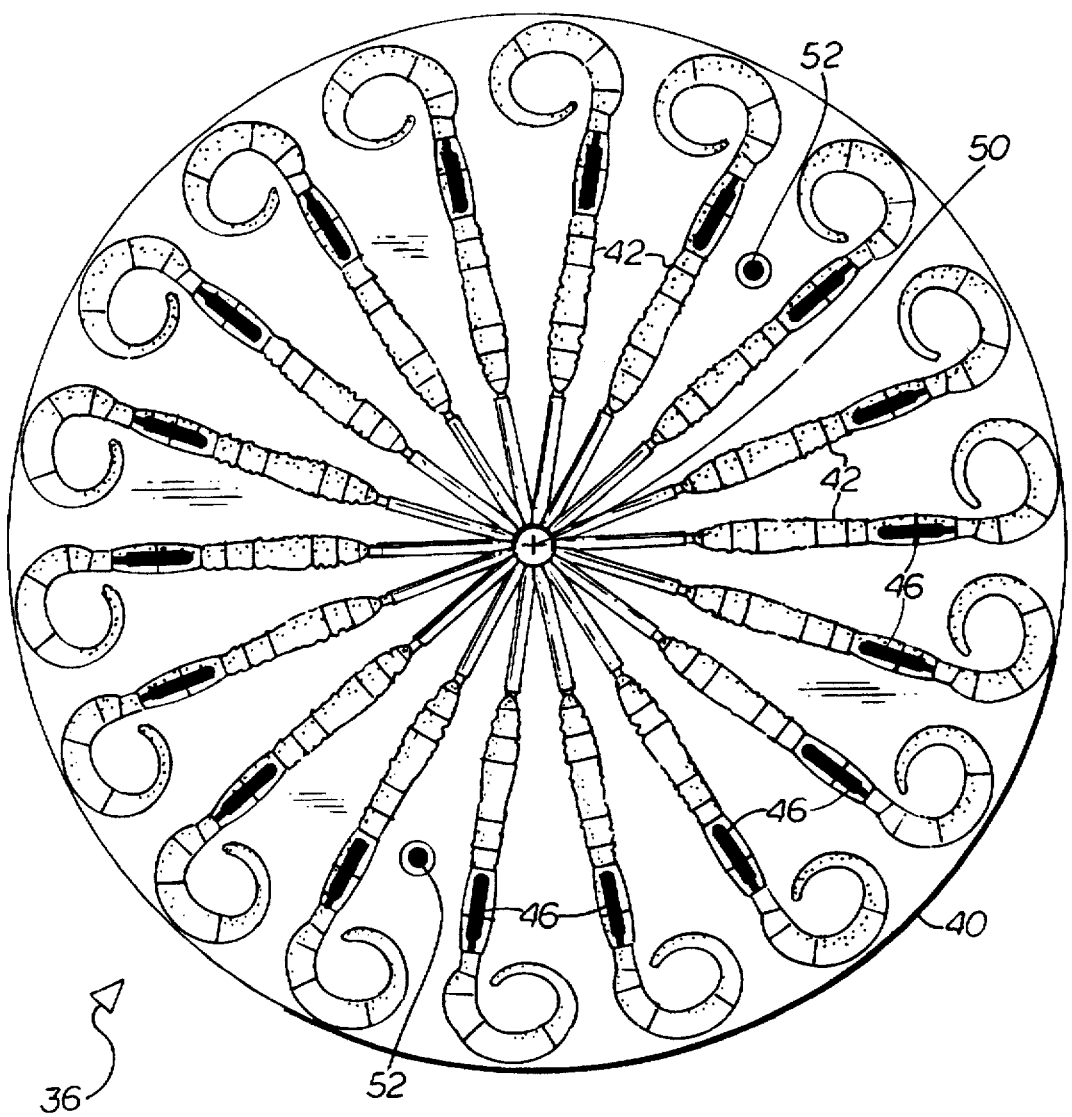
FIG. 3 is a view from above of a typical mold section in accordance with the instant invention, intended to be used in the creation of novel worms, with this view revealing the utilization of a male member or plug in each of the numerous cavities of this mold half, designed to create a stimulant-receiving cavity in the abdominal region of each worm.

In contrast with the arrangement utilized by Littleton, FIG. 3 of the instant invention identifies in slightly simplified form, one section of a mold arrangement 36 that I prefer to utilize. This mold section, in this instance the lower mold section 40, may be for example some 16 inches in diameter, and by the provision therein of a series of substantially identical cavities 42, the use of which some eighteen worms may be made at a time. Obviously I am not to be limited to this number of worms. Circular molds of this general type are commonly in use in the manufacture of plastic fishing lures and worms, and this showing is largely for the benefit of explaining the manner in which I preferably go about creating the novel cavity 20 in the abdominal region of each worm. Because of the provision of an elongate plug or egg sack core pin 46 in a mid portion of each cavity 42 of the mold, a hollow abdominal portion will be established in each worm that is created. The elongate plug may also be referred to as a male member, and it is to be seen in greater detail in FIG. 6, described hereinafter.

Figure 4:
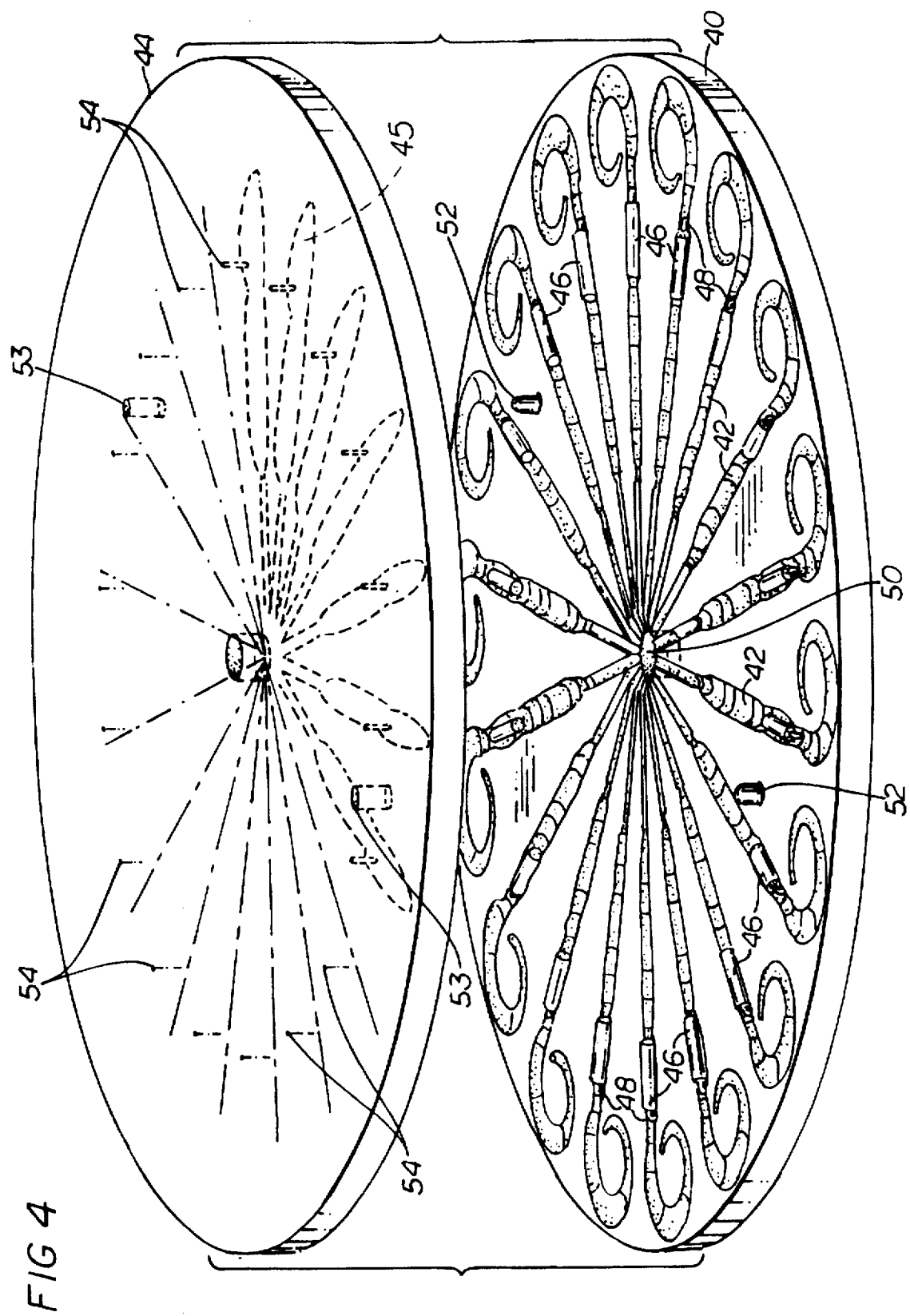
FIG. 4 is an exploded view revealing upper and lower mold sections in the approximate relationship in which they are to be brought carefully together immediately prior to the time that molten plastic is to be injected under pressure into the completed cavities of the mold sections.

With reference to FIG. 4, it is to be noted that a circular mold arrangement of the type I prefer to utilize is made up of upper and lower metal sections or components which contain an equal number of cavity portions, with upper mold section 44 disposed above, and in careful alignment with, the lower mold section 40.

Figure 6:
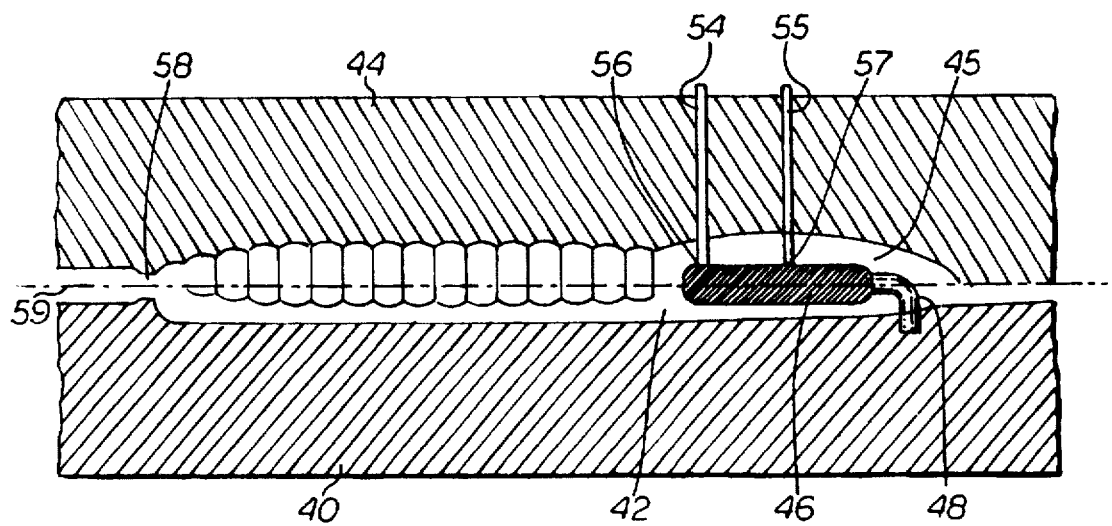
FIG. 6 is a view to a larger scale of a typical cavity created in the mold sections forming the subject matter of the instant invention, with this view revealing that the male member or elongate plug is supported in the lower mold section by a single, relatively thin supporting member that is utilized in a location essentially coinciding with the abdomen of the worm to be created, with the upper mold section being equipped with one or more pins serving to create at least one additional hole in the abdominal wall of the worm.

It is to be understood that cavity portions 42 in the lower mold section 40 are laid out in a careful relationship to the respective cavities 45 formed in the upper mold section 44, such that a number of completed cavities for the molding of worms are created upon the upper and lower mold sections being brought in a carefully aligned manner into an operable relationship. A preestablished number of completed cavities, each formed by a pair of closely adjacent cavities such as cavities 42 and 45 illustrated in FIG. 6 are thus created as a result of the cavity portions of the two mold sections being brought into a contiguous relationship as a consequence of the mold sections having been properly interfitted.

Although the upper and lower mold sections are shown in exploded relationship in FIG. 4, it is to be understood that in the usual instance, the upper and lower mold sections are hingedly secured together. When the mold sections have been moved into an interfitted relationship, 15 to 20 carefully configured upper cavities will be moved into desired alignment with an equal number of carefully configured lower cavities, thus forming what may be regarded as completed cavities.

Two or more alignment pins 52 are utilized in the lower mold section 40, to assure a careful alignment with the upper mold section 44 when the sections are brought into an operative relationship. The alignment pins 52 enter recesses 53 in the upper mold section when the mold sections are interfitted, thus to assure a careful alignment of the cavities of the two mold sections.

As by now should be clear, molten plastic at an appropriate temperature is forced into the completed cavities 42,45, thus causing the plastic to take on the configuration of the worms or lures being created. The number of cavities in a given mold is usually not of critical importance.

In accordance with the novel process I utilize in connection with my novel mold sections, molten PVC at approximately 340° Fahrenheit is injected into an inlet opening or hole 50 provided on the underside of the lower mold section 40, in the center thereof. This procedure will be discussed at greater length hereinafter in conjunction with FIGS. 8 and 9. The molten plastic then flows radially outwardly through the 15 or 20 completed cavities provided in the interfitted mold sections, to fill such cavities and in doing so, to create the worms.

It will be noted in FIGS. 3 and 4 that the previously mentioned male member or elongate plug 46, also known as an egg sack core pin, resides in each mold cavity 42. When the molten plastic is injected into the completed mold cavities 42,45, the elongate plug located in each mold cavity will cause the previously mentioned abdominal cavity 20 to be created in the worm formed in each cavity of the mold arrangement. The abdominal cavity of each worm can later be filled with a noise maker of suitable type, but more typically with the previously mentioned viscous gel having a taste attractive to fish.

Figure 7:
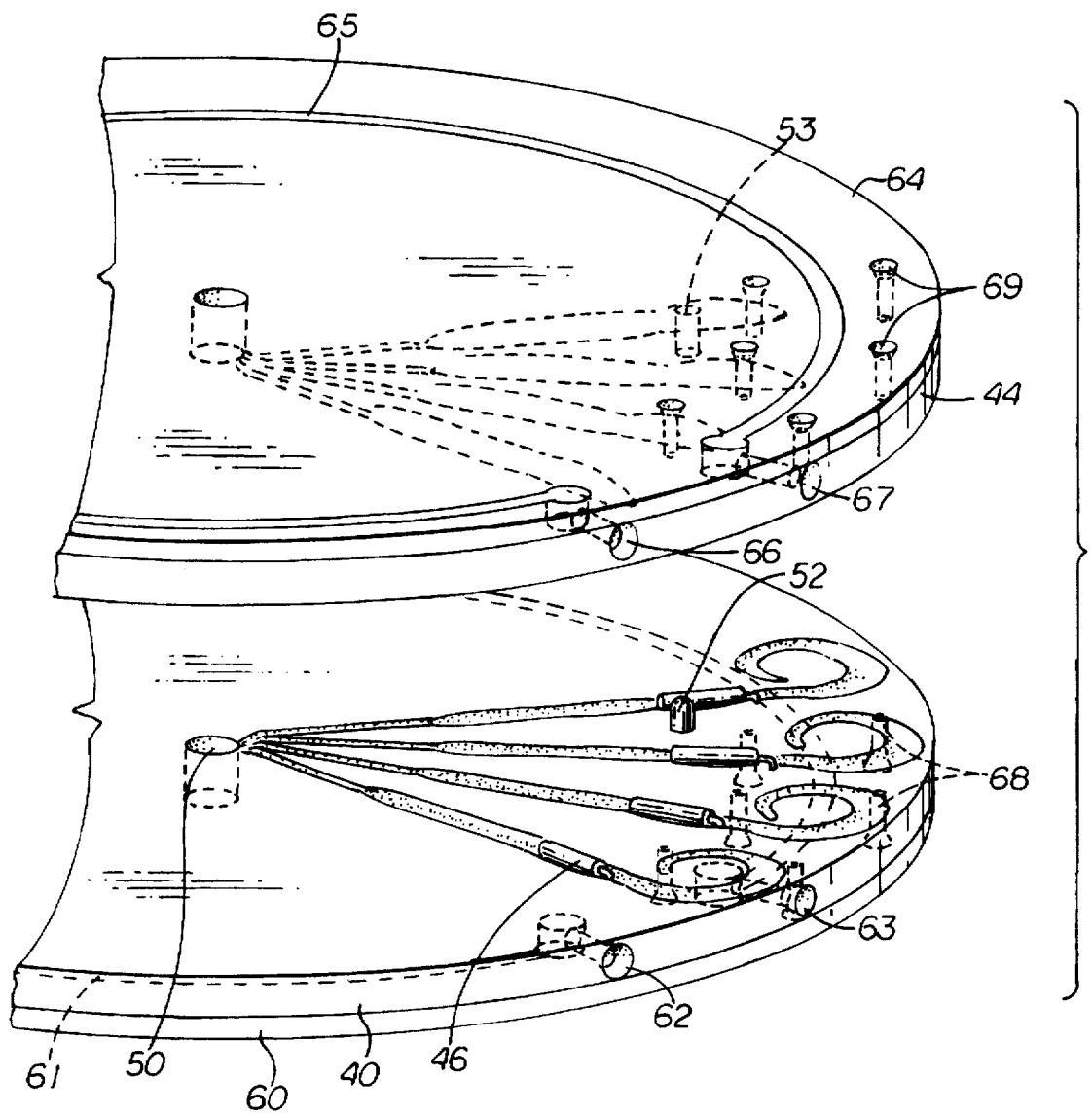
FIG. 7 is a view showing how components concerned with cooling the molds can be utilized, with only a portion of the total number of cavities being indicated in this particular instance.

The molds I prefer to use are typically fitted with a water jacket, of the type depicted in FIG. 7, through which water, usually at 72° F., is caused to flow in order to accomplish a suitable amount of cooling of the mold. Causing water to circulate through the mold enables the finished products to be removed much more quickly than otherwise would be possible, and I have found that cooling the molds in this manner usually enables the completed worms to be removed approximately 35 seconds after the injection of the molten plastic.

As is obvious, the lower mold section 40 and the upper mold section 44 are separated at the time the plastic has cooled sufficiently that all of the newly-created worms can be readily removed. As will be discussed hereinafter in conjunction with FIG. 9, neither of the molds are affixed to the press, or in other words, the mold halves are free to slide on the base plate 74 of the frame 70 as long as the molds are not under pressure from the press platen 72.

Figure 5:
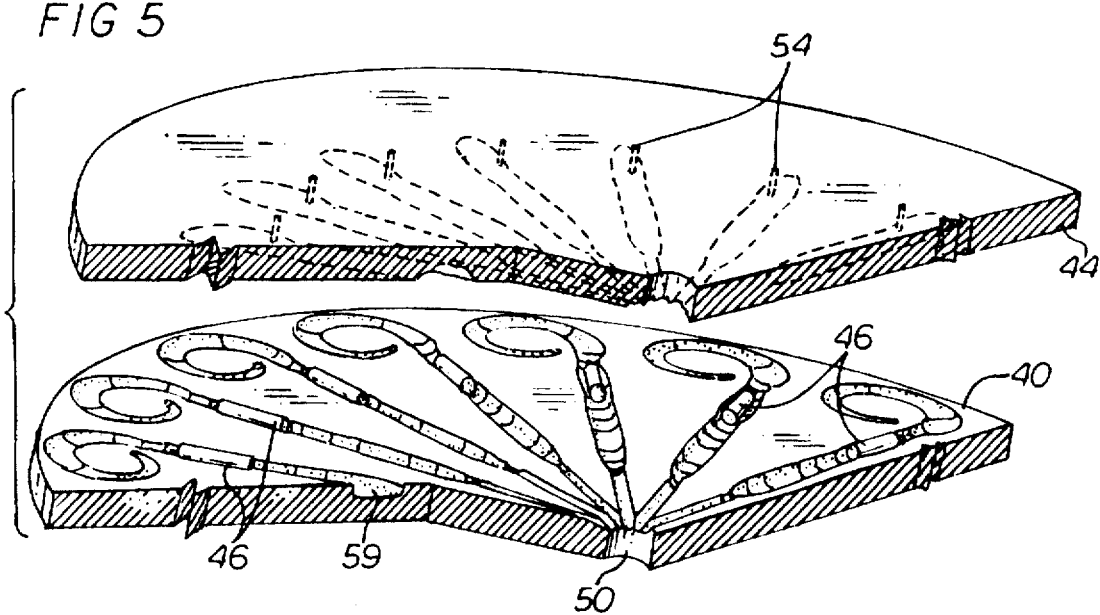
FIG. 5 is a fragmentary view generally relatable to FIG. 4, but prepared to a larger scale so as to depict significant details of the mold cavities of each mold section.

Turning now to FIG. 5 it will be seen that I have depicted fragmentary portions of the lower mold section 40 and the upper mold section 44, with this view illustrating the fact that the pin or pins 54 utilized in conjunction with each cavity of the upper mold section are in alignment with the respective elongate plug or core pin 46 utilized in each cavity of the lower mold section 40. A typical runner 59 is shown in some detail in the lower part of FIG. 5, and it is to be understood that after the upper and lower mold sections have been brought together in an aligned manner, molten plastic flows along such runners upon the hot plastic being injected through inlet hole 50.

With further reference to FIG. 6, additional details of the mounting of the plug or male member 46 in a typical lower mold section 40 can be seen more clearly, with it being shown that the plug or male member 46 is supported in a mid portion of the cavity defined between the mold halves, by the utilization of a small diameter supporting member 48. The supporting member 48 is placed on the end of the abdominal cavity away from the injection port 50 for the molten plastic, or in other words, on the downstream end of the male member 46 when the flow direction of the hot plastic is considered.

It is to be understood that after the injected plastic has cooled sufficiently, and the mold halves have been separated, the operator can pull on the head portions of the worms and at that time bring about the removal of the male member or plug 46 from the abdominal cavity of each worm. This arrangement would not be as conveniently possible if the support for each plug or male member 46 was at a location toward rather than away from the inlet port 50. It is to be understood that the PVC easily stretches to a sufficient amount as to enable each worm to be separated from its respective plug or male member 46.

From FIG. 6 it can be seen that vent pins 54 and 55 are mounted in the upper mold half or mold section 44, so that the lower point 56 of pin 54 and the lower point 57 of pin 55 move into contact with the plug or male member 46 when the mold sections are brought together into the operative position.

Although a pair of vent pins are depicted in this figure, in many instances only a single pin is necessitated, for usually only a single hole 26 is needed in the worm through which air is displaced as the gel is inserted into the abdominal cavity 20.

The vent pin 54 (and vent pin 55 if utilized), is mounted in a fixed relationship to the upper mold section 44, with this pin (or pins) serving to define and establish one or more holes in the abdominal portion of the worm during the procedure in which the worms are created. When the plastic has cooled and the mold halves have been separated, the vent pin 54 (and 55 if used) moves away from the plug or male member 46, so as not to interfere with the removal of the respective worm from the plug or male member.

Although only a single vent pin 54 is of particular importance, it is obvious that I can utilize two or more vent pins in the upper mold section at the location of each upper cavity 45 if such be necessary or desirable.

Also visible in FIG. 6 is the gate portion 58, which may for example have a diameter of 1/8", and the runner portion 59, which may for example have a diameter of 3/16", although I am obviously not to be limited to these dimensions.

It is to be understood that this invention also involves the novel method of creating a fishing worm containing a gel having a pleasant taste to a fish, utilizing the novel mold having upper and lower sections, between which are defined a number of cavities into which hot molten plastic may be injected.

The novel steps constituting this method comprise injecting hot molten plastic into the cavities of the mold such that each cavity is filled and the plug or male member mounted in each cavity is surrounded; opening the mold halves after the plastic has sufficiently cooled; and thereafter withdrawing the worms formed in the cavities, including pulling each worm off of the plug or male member around which the worm has been formed, thus creating a hollow abdominal portion in each worm, which cavity can be accessed for the insertion of an attractant gel or stimulant gel through the hole created in the sidewall of the worm's abdominal portion by the supporting member.

It is to be understood that by this method, the supporting member 48 serves to create a hole in the abdominal portion of the worm, through which hole the plug or male member 46 can be withdrawn when the worm is being removed from the mold, and through which hole, an attractant gel or stimulant gel can be inserted.

On the section of the mold opposite the supporting member are located one or a plurality of pins, also referred to as vent pins, which were described previously. These vent pins are mounted in the upper mold section such that one or a plurality of secondary holes will be created in the abdominal portion of the resulting worm. I find it highly desirable to have at least one secondary hole in each worm, to be of assistance during the insertion of the relatively viscous attractant gel or stimulant gel into the abdominal portion of the worm, in that air contained in the abdominal portion can be displaced through the second hole. This secondary hole serves the additional advantage of advising the fisherman when he has successfully filled the abdominal cavity with the gel.

As earlier mentioned, the gel can be inserted by the manufacturer, with appropriate sealant means utilized to prevent premature escape of the gel, but I prefer to have the fisherman insert the gel immediately prior to use of the worm.

It is thus to be seen that I have described the creation of a low cost worm whose abdominal cavity contains a fish attractant gel or stimulant gel, which will remain effective in the water for a comparatively long length of time, much longer than does an attractant of a watery nature. When the fish takes the worm into his mouth, some of the gel escapes through one or more of the holes connected to the abdominal area of the worm. The gel escaping into the mouth of the fish invites the fish to swallow the worm and thus become hooked.

With reference to FIG. 7, it is to be understood that a plate 60, known as a back plate or coolant plate, may be attached by a series of screws 68 to the lower side of the lower mold section 40. One or more passages 61 through which coolant liquid, typically water, can be circulated are provided in the underside of the lower mold section 40 in order to speed up the cooling of the newly created worms. The screws 68 are tightened sufficiently as to prevent any leakage between the members 40 and 60. Somewhat similarly, a back plate or coolant plate 64 may be attached by a series of screws 69 to the upper side of the upper mold section 44, with the upper back plate 64 likewise containing one or more passages 65 therein through which coolant liquid may be caused to flow.

Figure 8:
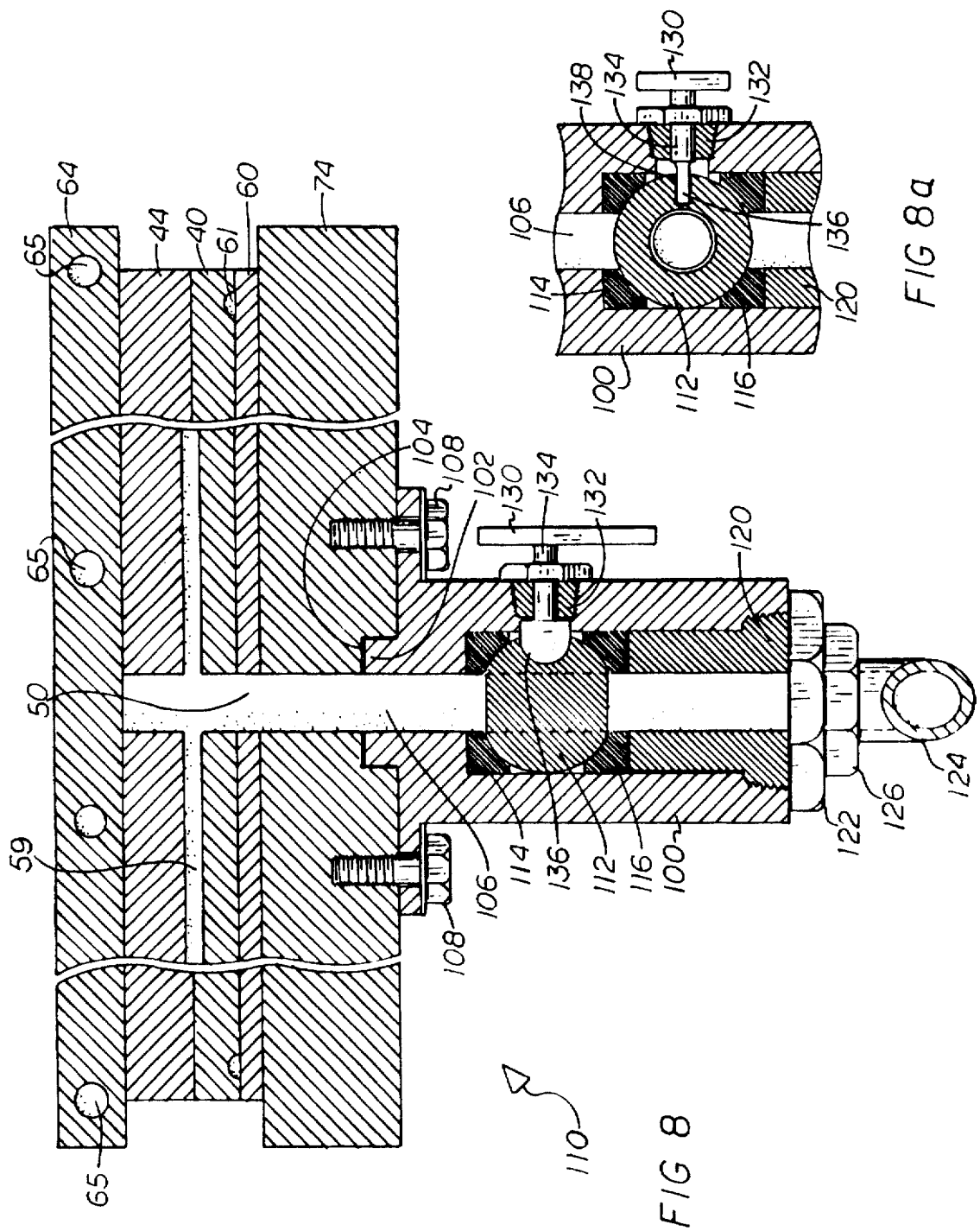
FIG. 8 is a cross sectional view revealing an embodiment of a manifold utilized for the selective admission of molten plastic into the cavities of the upper and lower mold sections, with a type of ball valve being utilized for controlling the flow of the molten plastic.

The relationships of the coolant passages 61 and 65 to their respective members are made clear in FIG. 8.

With continuing reference to FIG. 7, suitable inlet and outlet connections 62 and 63 are placed on the lower back plate 60 in order that the coolant liquid may be forced through the coolant passages 61 so as to bring about the desired rate of cooling of the lower mold section. Similarly, inlet and outlet connections 66 and 67 are placed on the upper back plate 64 in order that the coolant liquid may be forced through the coolant passages 65 to accomplish the desired rate of cooling of the upper mold section. The back plate 60 may for example be manufactured from ¼ inch thick metal, such as steel or aluminum, whereas the back plate 64 may be from ⅜ inch thick to ½ inch thick steel or aluminum. The coolant passages 61 may each be half round grooves milled or otherwise formed on the side opposite the cavities of the lower mold section 40.

The coolant passages 65 are typically circular, being drilled or otherwise formed in the upper cooling plate 64.

Figure 9:
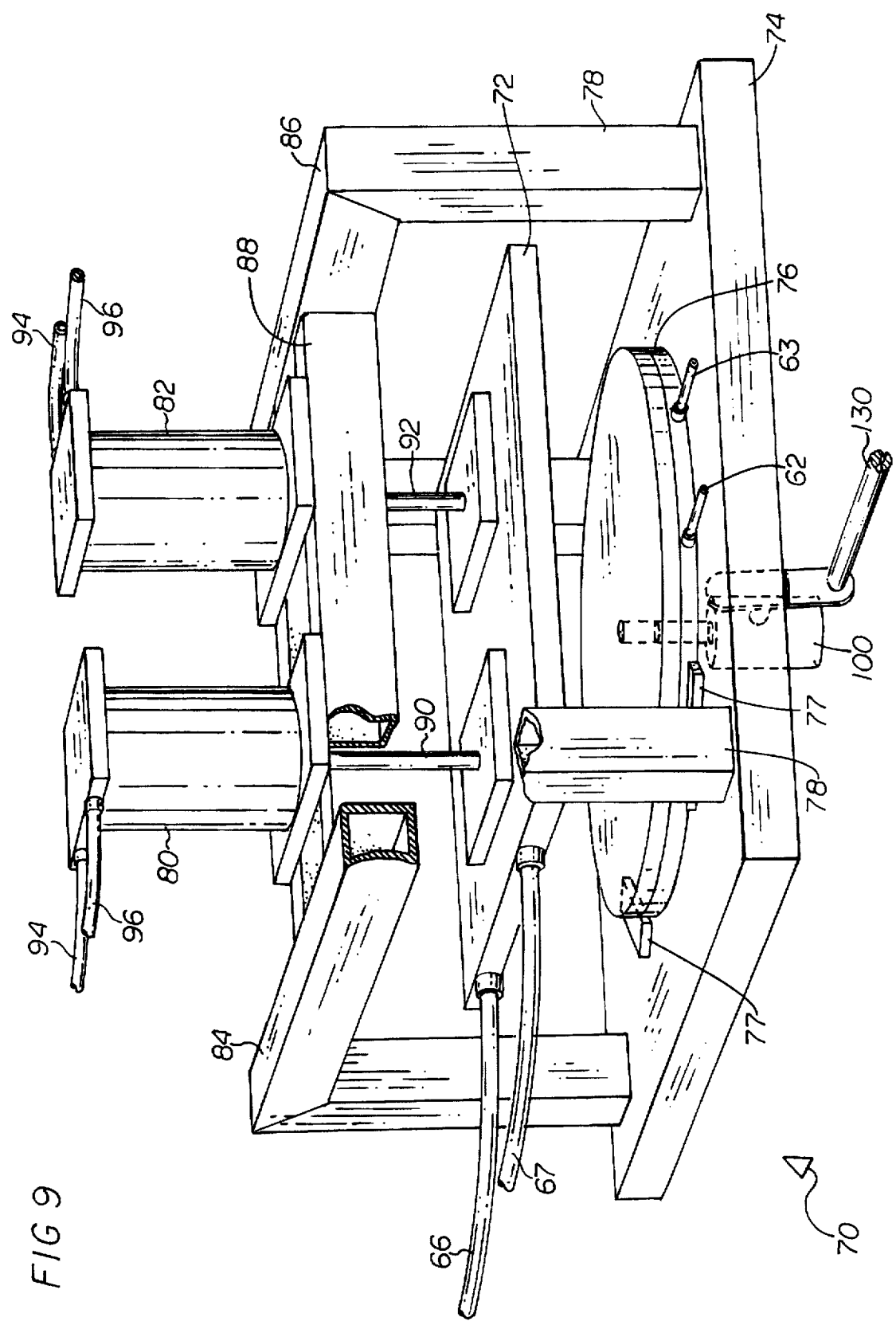
FIG. 9 is a view of a preferred arrangement for bringing about the application of a suitable amount of pressure to the mold sections, this arrangement involving the use of a frame for holding the mold sections tightly together during the insertion of molten plastic into the cavities of the molds.

Before considering the other aspects of FIG. 8 and its related FIG. 8a, the arrangement I prefer to use in connection with the actual molding process should be discussed, and with reference to FIG. 9, it will be seen that I have revealed a press plate support frame 70 upon which a press plate or platen 72 is operatively mounted. The press plate 72 is designed to apply a substantial amount of pressure to the two-piece molds 76 in which the worms in accordance with this invention are created, with these two-piece molds being represented by the subject matter of FIG. 7.

With continuing reference to FIG. 9, a rectangularly-shaped base plate 74 of sturdy construction may be seen to form an intrinsic part of the frame 70, with the upper surface of the base plate 74 representing the support for the two-piece mold 76. One or more alignment stops 77 are utilized on the upper surface of the base plate 74, to be of assistance to the operator in aligning the mold assembly with the injection manifold 100 located on the underside of the base plate, and depicted in considerable detail in FIG. 8.

A post 78 is revealed in FIG. 9 to be mounted adjacent each corner of the base plate 74, with these four posts forming a sturdy support for a pair of air cylinders 80 and 82. Upper rails 84 and 86, supported by the posts 78, extend along above each side of the base plate 74, with the rails 84 and 86 being in a substantially parallel relationship. Square steel channel is preferably utilized as the constructional material from which the structural components of the frame 70 are fabricated, but I obviously am not to be limited to this. The steel channel may be of material that for example is 2 inches square or 2 ½ inches square, but quite clearly, this detail is not one of the key features of this invention.

A parallel pair of support bars 88, also preferably of square steel channel, extend between mid portions of the upper rails 84 and 86, with the support bars 88 forming a firm, direct support for the pair of air cylinders or actuators 80 and 82. A movable rod extends downwardly from the center of each air cylinder, with the rods 90 and 92 being visible in FIG. 9. These rods are operatively associated with the cylinders 80 and 82, respectively, and may be regarded as piston rods inasmuch as each rod is directly connected to the respective piston (not shown) utilized in each air cylinder. As will be apparent to those skilled in this art, each of the rods 90 and 92 is moved in response to the movement of the piston contained in the respective air cylinder.

The piston rods 90 and 92 form the support for the press platen 72, and the powered movements of the rods are brought about in the vertical direction by the selective admission of compressed air to the cylinders 80 and 82, accomplished by the use of an appropriate control valve arrangement. The compressed air is always simultaneously admitted to the cylinders 80 and 82, so that the piston rods 90 and 92 will move together upwardly or downwardly as the case may be.

Although in some instances a single air cylinder will suffice for the operation of the press platen, I have found it more satisfactory to utilize a pair of air cylinders 80 and 82 supplied with identical amounts of air pressure for operating the press plate 72. I typically utilize air at a pressure in the range of 40 to 60 pounds per square inch for causing the press plate to apply pressure to the mold sections, but obviously I am not to be limited to this.

The use of the two cylinders 80 and 82 rather than a single cylinder is particularly important when the molds are large, for the use of two cylinders prevents mold distortion. Inasmuch as the molds are usually made of aluminum, they may tend to bend in an undesirable manner if pressure were to be applied in only a single location.

I am not to be limited to any particular arrangement for selectively applying pressure to the two piece mold 76, and I may, for example, utilize a hose 94 for supplying pressurized air to both actuator 80 and actuator 82 in connection with the lowering of the press plate 72, and a hose 96 connected to both actuators, for supplying pressurized air to both actuators in connection with the subsequent raising of the press plate, after the worms have cooled sufficiently.

As an alternative to this arrangement, I may utilize a single acting actuator of a type manufactured by Overland Brake, a corporation located at 400 State Road North, Nampa, Id. Latter type of actuator is equipped with an internal metal plate biased upwardly by a compression spring, with a location above the metal plate receiving pressurized air at such time as the press plate is to be moved downwardly. A single hose is needed for supplying compressed air to the upper portion of the actuator, with the pressure of the internal spring being sufficient for causing the press plate to return to its raised position when the supply of air to the actuator has been removed.

A two way control valve is utilized for controlling the action of this type of actuator, to which valve the air line to the actuator is connected. The control valve in one position selectively admits compressed air to the actuator, whereas when the control valve is in its other position, the compressed air supply is cut off, with the air from the actuator then being vented to the atmosphere. Quite obviously, the means for bringing about operative movement of the press plate does not form a patentable aspect of my machine.

Returning to FIG. 8, it will be seen that a central recess 104 is provided on the underside of the base plate 74, into which the upwardly extending protrusion 102 of an injection manifold 100 extends, thus minimizing any tendency for hot plastic injected upwardly through the central passage 106 of the manifold 100 to undesirably flow outwardly between the manifold and the underside of the base plate.

As is visible in FIG. 8, two or more bolts 108 are threadedly received in the bottom surface of the base plate 74, which bolts serve to hold the manifold 100 tightly in the operative position depicted in this figure.

Further revealed in FIG. 8 is a valve member 110, which in the preferred instance is a ball valve involving a rotatably mounted ball member 112. Mounted above and below the ball member 112 are washer members 114 and 116 of plastic, with respect to which the ball member 112 freely turns. A large threaded nut 120 is threadedly received in the bottom of the injection manifold member 100, with a hex member 122 on the nut enabling the nut 120 to be tightened so as to cause a desirable amount of sealing pressure to exist between the ball member 112 and the washer members 114 and 116 as will prevent leakage of the hot plastic.

The hot plastic is supplied to the injection manifold 100 by tubing 124, which is connected in the center of the nut 120. A hex fitting 126 operatively associated with the tubing 124 is threadedly received in internal threads provided in the central passage through the nut 120, with this arrangement enabling the tubing to be held to the nut in a leakfree manner.

With further regard to the ball member 112, it will be noted from FIG. 8 as well as fragmentary FIG. 8a that the rotation of the ball member is controlled by a handle 130 externally mounted in a rotatable manner on the manifold 100. More particularly, a threaded fitting 132 is provided in the sidewall of the manifold 100, with a shaft 134 rotatably mounted in the threaded fitting. To the outer end of the shaft 134 the handle 130 is attached. It is to be realized that the ball member 112 is illustrated in the flow-permitting position in FIG. 8, and in the flow-inhibiting position in FIG. 8a.

It is to be understood that the innermost portion of the shaft 134 is represented by a flattened member 136 having a curved outer contour that is designed to engage a slot 138 provided in the sidewall of the ball 112, which slot is visible in FIG. 8a. As a result of this arrangement, upon the handle 130 being moved by the operator at the appropriate time, the shaft 134 is caused to rotate and in turn to cause the ball member 112 to rotate from the closed, flow-blocking position indicated in FIG. 8a, into the open position indicated in FIG. 8, so as to permit the flow of hot plastic upwardly through the central passage 106 of the manifold 100. The hot plastic thereafter flows through the aperture in the bottom of the base plate 74, and up into the mold sections. As is obvious from FIG. 8, the hot plastic enters the inlet port 50 of the lower mold section 40 and thereafter enters the runners 59 depicted in the upper portion of this figure, so as to flow into and fill the cavities defined by the lower mold section 40 and the upper mold section 44.

Cleaning of the valve member 110 is seldom necessary, but can easily be accomplished by removal of the large nut 120 and the shaft 134, after which the ball member 112 can be readily removed.

The positioning of the ball member 112 being controlled by the handle 130, the operator moves the handle so as to move the ball member 112 to the open position when plastic is to flow into the cavities of the molds, with the handle thereafter being moved to the valve-closing position when the cessation of flow of the hot plastic is to be brought about.

As to the operation of my device, before the injection cycle begins, the operator brings the upper and lower mold sections into a closed, carefully aligned relationship and then slides the pair of mold sections against the alignment stops 77, which are of course visible in FIG. 9. This brings about the alignment of the inlet port 50 of the lower mold section 40 with the upwardly extending central passage 106.

The operator then begins the cycle by actuating the start button (not shown) which causes the air controlling valve associated with the downward movement of the piston rods 90 and 92 to open, resulting in the porting of compressed air to the upper ends of the air cylinders 80 and 82. The descending of the piston rods 90 and 92 causes the press plate 72 to be brought into very close contact with the upper surface of the two-piece mold 76. Sufficient pressure is applied as to make it unlikely that hot plastic will tend to flow outwardly from the location between the base plate 74 and the lower cooling plate 60. At this point the operator causes the plastic-controlling valve member 110 to open so that a proper amount of hot plastic will enter the carefully aligned cavities of the upper and lower mold sections, thus to bring about the creation of a desired number of the novel worms.

After pressure has been maintained on the mold sections for a desired length of time, the operator manipulates the air controlling valve such that the pistons associated with air cylinders 80 and 82 are permitted to rise and thereby cause the press platen 72 to rise. This upward movement of the press platen makes it possible for the operator to move the two-piece mold 76 from the center location, to a location on the base plate 74 providing more access to the operator, so that he or she can lift the upper mold section and bring about the removal of the worm array. As mentioned previously, the operator grasps the center of the worm array, and because of the appropriate positioning of the core pins 46, he or she is readily able to remove the worms of the array from their respective cavities.

Subsequent to removal from the cavities, the worms are separated and then further processed.

I claim:

1. A mold utilized for creating a fishing worm having an abdominal region intended to receive a feeding stimulant having a stimulating taste to a fish, said mold having first and second sections, with each section having a cavity portion, with each cavity portion representing a part of a desired worm configuration, the cavity portion of one mold section being able to be brought into careful alignment with the cavity portion of the other mold section, after which molten plastic can be injected into the completed mold cavity constituted by the aligned cavity portions of said first and second mold sections, an elongate plug held in place by a small diameter supporting member rigidly mounted in a mid portion of said cavity of said first mold section, at a position corresponding to the abdominal region of the worm to be created, whereby upon molten plastic being inserted into the completed mold cavity, a plastic worm having sidewalls will be defined, with such worm having an essentially closed abdominal cavity resulting from the utilization of said plug, and with said small diameter supporting member causing a hole to be made in the abdominal sidewall of each plastic worm so created.

2. The mold utilized for creating a fishing worm that contains an attractant gel having a stimulating taste to a fish as recited in claim 1 in which a pin is mounted in said second mold section, serving to create a second hole in the sidewall of the abdominal region of the worm being created, such second hole later permitting air contained in the abdominal region of the completed worm to be displaced during the injection of gel into the worm.

3. The mold utilized for creating a fishing worm that contains an attractant gel having a stimulating taste to a fish as recited in claim 1 in which a pair of pins are mounted in said second mold section, serving to create second and third holes in the sidewall of the abdominal region of the worm being created, such holes later permitting air contained in the abdominal region of the completed worm to be displaced during the insertion of gel into the worm.

4. A mold utilized for creating fishing worms, each of which have an abdominal region intended to receive a gel having a stimulating taste to a fish, said mold having a pair of interfitting sections, with each mold section involving a number of cavity portions, and with each cavity portion representing a desired worm configuration, with the cavity portions of one mold section being able to be brought into careful alignment with the corresponding cavity portions of the other mold section when said mold sections have been brought together into an operable relationship, after which molten plastic can be injected into the completed cavities, a first of said mold sections utilizing an elongate plug held in place by a small diameter supporting member rigidly mounted in a mid portion of each cavity of said first mold section, at a position corresponding to the abdominal region of each worm to be created, whereby upon molten plastic being inserted into the completed mold cavities, a plurality of plastic worms having sidewalls will be defined, with each worm having an essentially closed abdominal cavity resulting from the utilization of said plugs, and with the respective small diameter supporting member causing a hole to be made in the abdominal sidewall of each plastic worm so created.

5. The mold utilized for creating a fishing worm that contains a gel having a stimulating taste to a fish as recited in claim 4 in which a pin is mounted in each of said second mold sections, said pin serving to create a second hole in the sidewall of the abdominal region of each worm being created, such second hole later permitting air contained in the abdominal region of each completed worm to be displaced during the insertion of gel into the worm.

6. The mold utilized for creating a fishing worm that contains a gel having a stimulating taste to a fish as recited in claim 4 in which a pair of pins are mounted in each of said second mold sections, serving to create second and third holes in the sidewall of the abdominal region of each worm being created, such holes later permitting air contained in the abdominal region of each completed worm to be displaced during the insertion of gel into the worm.

7. A mold utilized for creating a fishing worm having an abdominal region intended to receive a feeding stimulant gel having a stimulating taste to a fish, said mold having a pair of interfitting sections, with each mold section involving a number of cavity portions, with each cavity portion representing a desired worm configuration, with the cavity portions of a first of said mold sections being able to be brought into careful alignment with the corresponding cavity portions of the second of said mold sections when said mold sections have been brought together into an operable relationship, after which molten plastic can be injected into the completed cavities, an elongate plug held in place by a small diameter supporting member rigidly mounted in a mid portion of each cavity of said first mold section, at a position corresponding to the abdominal region of each worm to be created, said second mold section utilizing at least one fixed pin, disposed in a mid portion of each cavity of said second mold section, with each such pin being located in alignment with the respective elongate plug of said first mold section, each of said pins having a tip, with the length of each such pin being such that the tip of each pin is in contact with the elongate plug utilized in the respective cavity of each of said first mold sections when said mold sections have been interfitted, whereby upon molten plastic being inserted into the completed mold cavities, a plurality of plastic worms having sidewalls will be defined, with each worm having an essentially closed abdominal cavity resulting from the utilization of said plug, with the small diameter supporting member and the pin utilized in conjunction with each completed cavity causing at least one hole to be established in the abdominal sidewall of each worm created during the molding process.

* * * * *